United States Patent
Julian et al.

(10) Patent No.: US 10,210,464 B2
(45) Date of Patent: Feb. 19, 2019

(54) ONLINE TRAINING FOR OBJECT RECOGNITION SYSTEM

(71) Applicant: QUALCOMM Incorporated, San Diego, CA (US)

(72) Inventors: David Jonathan Julian, San Diego, CA (US); Anthony Sarah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 14/856,481

(22) Filed: Sep. 16, 2015

(65) Prior Publication Data

US 2016/0267395 A1    Sep. 15, 2016

Related U.S. Application Data (60) Provisional application No. 62/131,788, filed on Mar. 11, 2015.

(51) Int. Cl.
| | |
|---|---|
| G06N 99/00 | (2010.01) |
| G06K 9/00 | (2006.01) |
| G06K 9/62 | (2006.01) |
| G06N 5/04 | (2006.01) |
| G06N 3/02 | (2006.01) |

(52) U.S. Cl.
CPC ....... *G06N 99/005* (2013.01); *G06K 9/00107* (2013.01); *G06K 9/6262* (2013.01); *G06K 9/6269* (2013.01); *G06N 5/046* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 8,015,132 B2 | 9/2011 | Xu | |
| 8,224,029 B2 * | 7/2012 | Saptharishi | ........ G06K 9/00771 382/103 |
| 8,239,336 B2 | 8/2012 | Le Roux et al. | |
| 8,386,401 B2 | 2/2013 | Virkar et al. | |
| 8,972,253 B2 | 3/2015 | Deng et al. | |
| 8,972,316 B2 | 3/2015 | Nugent | |
| 2008/0253625 A1 | 10/2008 | Schuckers et al. | |
| 2011/0213737 A1 | 9/2011 | Baughman | |
| 2012/0263376 A1 | 10/2012 | Wang et al. | |

FOREIGN PATENT DOCUMENTS

| | | |
|---|---|---|
| WO | 2009111498 A2 | 9/2009 |
| WO | 2013116865 A1 | 8/2013 |

OTHER PUBLICATIONS

International Search Report and Written Opinion—PCT/US2016/018964 ISA/EPO—dated May 4, 2016.

* cited by examiner

*Primary Examiner* — Alan Chen
(74) *Attorney, Agent, or Firm* — Seyfarth Shaw LLP (57) ABSTRACT

A method of online training of a classifier includes determining a distance from one or more feature vectors of an object to a first predetermined decision boundary established during off-line training for the classifier. The method also includes updating a decision rule as a function of the distance. The method further includes classifying a future example based on the updated decision rule.

32 Claims, 7 Drawing Sheets

ONLINE TRAINING FOR OBJECT RECOGNITION SYSTEM

CROSS REFERENCE TO RELATED APPLICATION

This application claims the benefit under 35 U.S.C. § 119(e) to U.S. Provisional Patent Application No. 62/131,788, entitled "ONLINE TRAINING FOR OBJECT RECOGNITION SYSTEM," filed on Mar. 11, 2015, the disclosure of which is expressly incorporated herein by reference in its entirety.

BACKGROUND

Field

Certain aspects of the present disclosure generally relate to machine learning and, more particularly, to systems and methods for improving online training for object classification.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect of the present disclosure, a method of online training of a classifier is disclosed. The method comprises determining a distance from one or more feature vectors of an object to a first predetermined decision boundary established during off-line training for the classifier. In one configuration, the one or more feature vectors are received during on-line training. The method also includes updating a decision rule as a function of at least the distance. The method further includes classifying a future example based on the updated decision rule.

Another aspect of the present disclosure is directed to an apparatus including means for determining a distance from one or more feature vectors of an object to a first predetermined decision boundary established during off-line training for the classifier. In one configuration, the one or more feature vectors are received during on-line training. The apparatus also includes means for updating a decision rule as a function of at least the distance. The apparatus further includes means for classifying a future example based on the updated decision rule.

In another aspect of the present disclosure, a computer program product for online training of a classifier is disclosed. The computer program product has a non-transitory computer-readable medium with non-transitory program code recorded thereon. The program code is executed by a processor and includes program code to determine a distance from one or more feature vectors of an object to a first predetermined decision boundary established during off-line training for the classifier. In one configuration, the one or more feature vectors are received during on-line training. The program code also includes program code to update a decision rule as a function of at least the distance. The program code further includes program code classify a future example based on the updated decision rule.

Another aspect of the present disclosure is directed to an apparatus for online training of a classifier having a memory and one or more processors coupled to the memory. The processor(s) is configured to determine a distance from one or more feature vectors of an object to a first predetermined decision boundary established during off-line training for the classifier. In one configuration, the one or more feature vectors are received during on-line training. The processor(s) is also configured to update a decision rule as a function of at least the distance. The processor(s) is further configured to classify a future example based on the updated decision rule.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

During online training, reader devices, such as fingerprint readers or iris scanners, may determine whether an object is a match with a trained sample. In conventional systems, during the initial off-line training, a number of positive matches, such as true fingers, and negative matches, such as doctored fingers, are used for the training. The positive matches and negative matches may also be used for determining an initial decision boundary.

Additionally, in conventional systems, the decision boundary may be fine-tuned with online training when the fingerprint reader is used. For many use cases, such as spoofing real fingerprints, only positive examples or an increased number of positive examples in comparison to the negative examples are provided during the online training. Still, an increased number of positive examples may update the feature vector classifier such that the decision boundary is moved away from the positive examples, thereby increasing the probability that a fake finger would be classified as a true finger.

Aspects of the present disclosure are directed to decreasing the probability that a fake finger is classified as a true finger by improving the classification boundary for the device owner's finger. Although the present description is with respect to finger classification, it is noted that fingers are merely one example of an object to be classified. The present disclosure applies equally to any other type of object.

Figure 1:
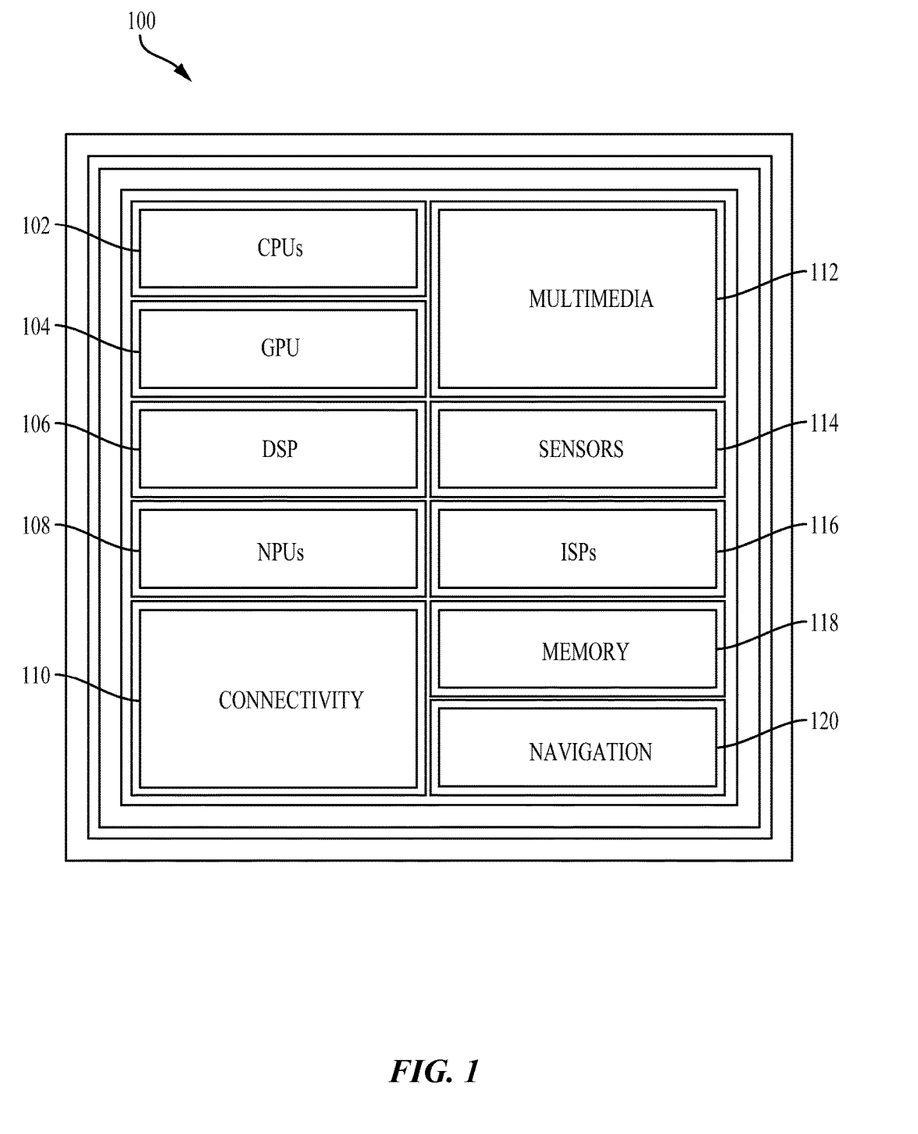
FIG. 1 illustrates an example implementation of designing a neural network using a system-on-a-chip (SOC), including a general-purpose processor in accordance with certain aspects of the present disclosure.

FIG. 1 illustrates an example implementation 100 of the aforementioned online training of a classifier using a system-on-a-chip (SOC) 100, which may include a general-purpose processor (CPU) or multi-core general-purpose processors (CPUs) 102 in accordance with certain aspects of the present disclosure. Variables (e.g. neural signals and synaptic weights), system parameters associated with a computational device (e.g. neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC may be based on an ARM instruction set. In an aspect of the present disclosure, the instructions loaded into the general-purpose processor 102 may comprise code for determining a distance from one or more feature vectors of an object, which is observed during the online training, to a first predetermined decision boundary established during off-line training for the classifier. The instructions loaded into the general-purpose processor 102 may also comprise code for updating a decision rule as a function of the distance. The instructions loaded into the general-purpose processor 102 may further comprise code for classifying a future example based on the updated decision rule.

Figure 2:
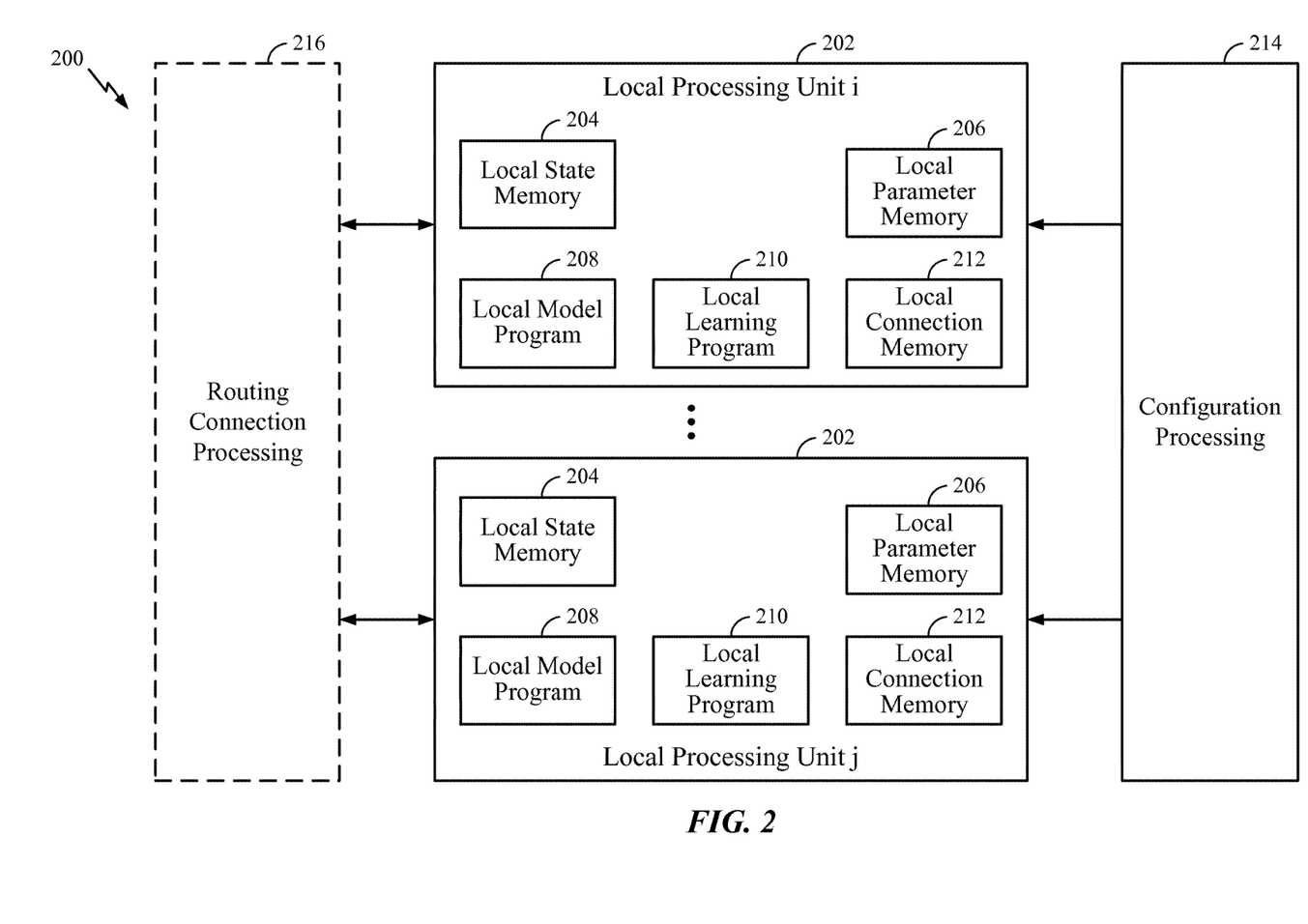
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that unfold in time. A connection from a neuron in a given layer to a neuron in a lower layer is called a feedback (or top-down) connection. A network with many feedback connections may be helpful when the recognition of a high level concept may aid in discriminating the particular low-level features of an input.

In one configuration, a machine learning model is configured for determining a distance from one or more feature vectors of an object to a first predetermined decision boundary established during off-line training for the classifier. In one configuration, the one or more feature vectors are received during online training. The model is also configured for updating a decision rule as a function of at least the distance. The model is further configured for classifying a future example based on the updated decision rule. The model includes a determining means, updating means, and/or classifying means. In one aspect, the determining means, updating means, and/or classifying means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the machine learning network based upon desired one or more functional features of the network, and develop the one or more functional features towards the desired functional features as the determined parameters are further adapted, tuned and updated.

Decision Boundary Improvement for an Object Recognition System

As previously discussed, during online training, reader devices, such as fingerprint readers or iris scanners, may determine whether an object is a match with a trained sample. Furthermore, for some reader devices, it is desirable to improve the reader so that the reader may determine whether the object is an actual object or a doctored object. For example, the object may be a finger. Thus, a doctored finger refers to an object that is not an actual finger. For example, the doctored finger is an object that may be used to mimic a fingerprint, such as a plastic finger with an embedded fingerprint. The doctored finger may be referred to as a fake finger.

In conventional systems, during the initial off-line training, positive matches and negative matches may be used for determining an initial decision boundary. In one configuration, the initial decision boundary is determined via an example vector classifier. The example vector classifier may be a support vector machine (SVM) classifier. Furthermore, the classifier may be a linear classifier or a nonlinear classifier.

It should be noted that the example vectors may define a boundary. That is, example vectors refer to the off-line determined set of feature vectors that define/determine a decision boundary. In one example, for a support vector machine, the example vectors would be support vectors. Furthermore, a feature vector refers to a vector determined for each object, such as a fingerprint. Additionally, a minimum vector may refer to a feature vector at a distance $D_{min}$.

Figure 3:
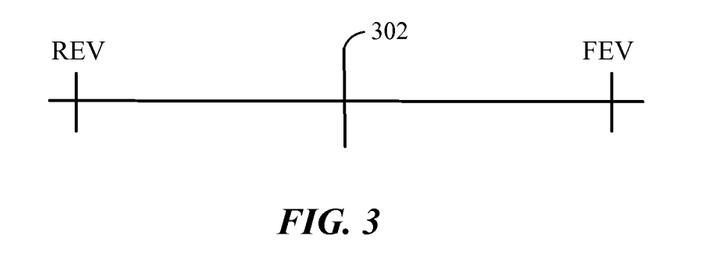
FIGS. 3-5 are one-dimensional illustrations of positive and negative examples in relation to a decision boundary.

Additionally, in conventional systems, the decision boundary may be fine-tuned with online training when the fingerprint reader is used. FIG. 3 illustrates a one-dimensional example of a decision boundary 302 that is a boundary between a real example vector (REV), for determining whether a fingerprint is from a real finger, and a fake example vector (FEV), used to determine whether a fingerprint is from a fake finger. Based on margin maximization, the decision boundary 302 is placed halfway between the real example vector and the fake example vector. In the example of FIG. 3, a finger may be classified as real if it is detected between the real example vector and the decision boundary 302. Alternatively, the finger may be classified as fake if it is classified between the decision boundary 302 and the fake example vector.

Figure 4:
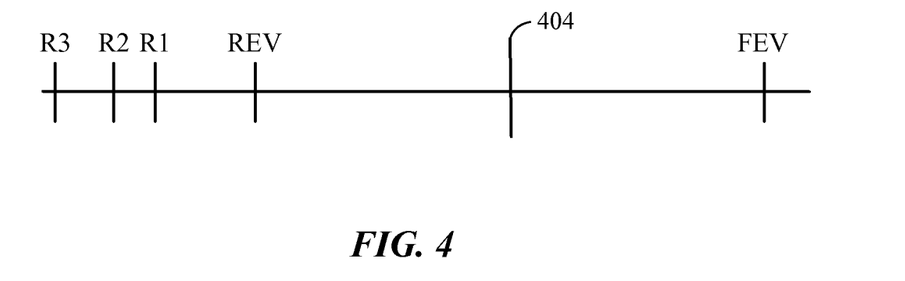

FIG. 4 illustrates an example of using online training for a decision boundary 404 in a conventional device. As shown in FIG. 4, the device may receive multiple fingerprints R as online training samples. The multiple fingerprints described may be vectors corresponding to the received fingerprints. As shown in FIG. 4, the multiple fingerprints R1-R3 may be further away from the decision boundary 404 than the real example vector. Thus, in this example, because the fingerprints R1-R3 are farther away from the real example vector, the decision boundary 404 is not adjusted.

Figure 5:
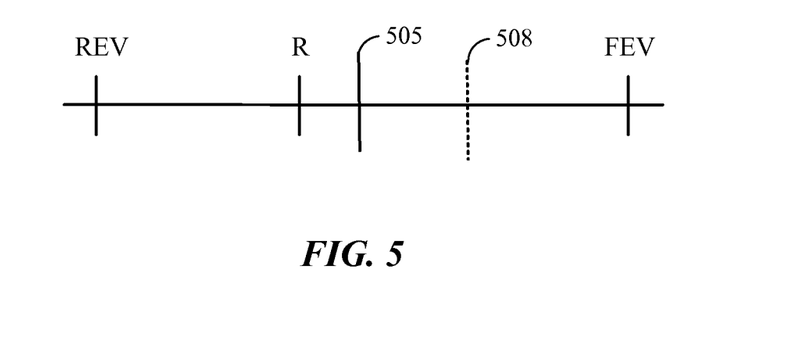

FIG. 5 illustrates an example of using online training for an initial decision boundary 505 in a conventional device. As shown in FIG. 5, the device may receive a fingerprint R for training. Additionally, as shown in FIG. 5, the fingerprint R may be closer to the initial decision boundary 505 than the real example vector. Thus, in this example, because the fingerprint R is closer to the initial decision boundary, based on margin maximization, the initial decision boundary 505 is adjusted so that a modified decision boundary 508 is located halfway between the new fingerprint R and the fake example vector. In this example, because the modified decision boundary 508 has been moved to be closer to the fake example vector than the real example vector, doctored fingers may be falsely categorized as true fingers. This may be contrary to the desired effect of using online fingerprints to tighten the spoofing boundary to the user's finger.

Furthermore, in this example, the position of the real example vector may also be adjusted to the position of the received fingerprint R. Thus, in this example the modified decision boundary 508 may be further moved towards the fake example vector if subsequent fingerprint test samples are received that are closer to the modified decision boundary 508 than the adjusted real example vector (e.g., the position of the received fingerprint R).

Conventional systems do not fine-tune or customize the fingerprint reader based on online usage. Rather, the conventional systems maintain the off-line trained decision boundary. Additionally, or alternatively, a conventional system may include negative examples for use in the online training.

As previously discussed, aspects of the present disclosure are directed to decreasing the probability that a fake finger is classified as a true finger by improving the classification boundary for the device owner's finger. Although the present description is with respect to finger classification, it is noted that fingers are merely one example of an object to be classified. The present disclosure applies equally to any other type of object.

In one configuration, the decision boundary for a device is improved based on increased use, such as daily use, with positive examples received during online training. That is, an online training example may be a positive example of a real finger. More specifically, in one configuration, negative samples are not received during online training. The improved decision boundary may result in a more secure fingerprint recognition over time. That is, the device may be harder to compromise via a false reading.

In the present configuration, the device is initialized with the off-line trained fingerprint recognizer. As an example, the off-line training may generate a decision boundary 302 (FIG. 3) for determining whether a finger is real or fake. During the initialization, a distance ($D_{min}$) is set to a predetermined value, such as infinity or negative one. Additionally, during the initialization, the number of fingerprints received N is set to zero. The distance ($D_{min}$) is the closest distance between a fingerprint vector received during online training and the decision boundary. The distance ($D_{min}$) may be referred to as a minimum vector distance ($D_{min}$). The fingerprint vector may be referred to as a fingerprint feature vector.

After initialization, the user may register multiple fingerprints as training samples. The device may compute the distance ($D_{fv}$) of each fingerprint to the decision boundary. For example, the device may use the inner product of each fingerprint feature vector and the decision boundary hyperplane unit vector to calculate the distance ($D_{fv}$). In this configuration, the received fingerprint having a distance ($D_{fv}$) that is closest to the decision boundary is maintained as a new vector. The new vector may be referred to as the tightest point seen online (TPSO). Additionally, in one configuration, any previously cached fingerprint feature vectors are discarded.

In addition, the value of ($D_{min}$) is updated to equal the fingerprint distance ($D_{fv}$) that is associated with the tightest point seen online. Furthermore, the number of received fingerprints N is incremented based on the number of fingerprints received. In this configuration, the off-line trained example vectors are maintained and are used to set the orientation of a modified decision boundary. Furthermore, in the present configuration, the tightest point seen online and number of fingerprints received N are used for decision boundary adjustment. In one configuration, the tightest point seen online is the minimum observed value of $D_{fv}$ that is on the side of the decision boundary associated with real example vectors. In most cases, as the number of received fingerprints N increases, a new fingerprint distance ($D_{fv}$) to the initial decision boundary should be greater than the distance ($D_{min}$) of the tightest point seen online to the decision boundary plus or minus a delta value. The use of the delta value is optional.

In one configuration, the modified decision boundary may be adjusted based on the number of fingerprints received. That is, if the number of fingerprints received is less than a threshold, then the adjustment for the modified decision boundary is throttled so that the modified decision boundary is not adjusted by a high amount. Alternatively, the amount of adjustment for the modified decision boundary may be increased if the number of fingerprints received is greater than a threshold. Specifically, in the present configuration, for the true finger versus false finger classifier, the device adjusts the position of a modified decision boundary for a successful true finger classification by an amount based on a function $$\left( (D_{min} - M_{min}) \times \left(1 - \frac{1}{N}\right)^k \right)$$

of the number of received fingerprints N and the closest distance ($D_{min}$) between a received fingerprint and the initial decision boundary.

Moreover, in one configuration, each time the user successfully uses their fingerprint (e.g., successful fingerprint recognition and successful true finger recognition) the aforementioned steps that follow the initialization are repeated.

Figure 6A:
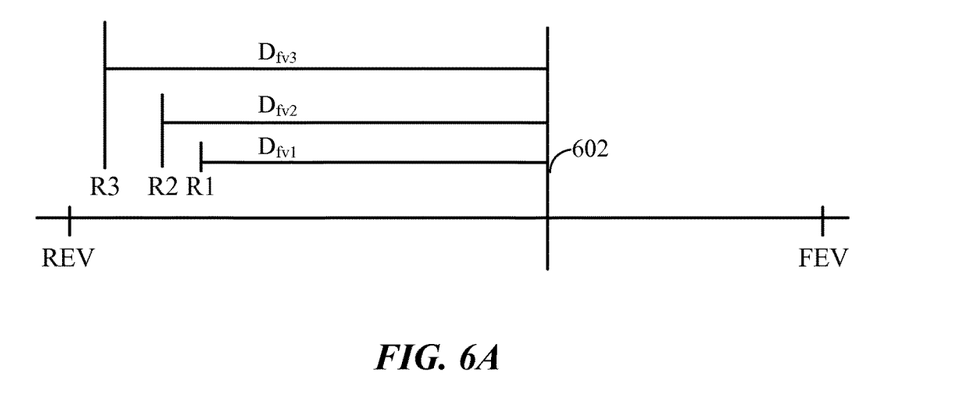
FIGS. 6A-B and 7 are one-dimensional illustrations of positive and negative examples in relation to a decision boundary according to aspects of the present disclosure.
Figure 6B:
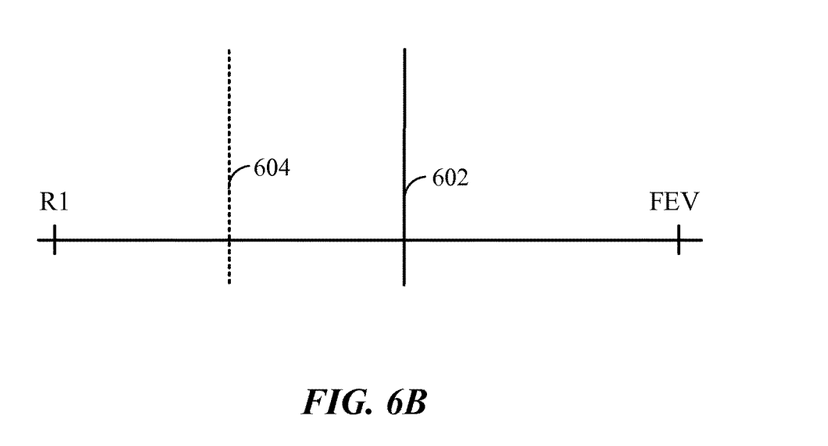

FIG. 6A illustrates an example of determining a modified decision boundary according to an aspect of the present disclosure. As shown in FIG. 6A, a real example vector (REV), a fake example vector (FEV), and an initial decision boundary 602 are specified based on the off-line training. After initialization (e.g., after the off-line training is complete), the device may receive multiple fingerprints (R1-R3) for testing. As shown in FIG. 6A, the device calculates a distance for a set of values ($D_{fv1}$, $D_{fv2}$, $D_{fv3}$) between each fingerprint sample and the initial decision boundary 602. In this example, the distance ($D_{fv1}$) for a first finger R1 is the closest to the initial decision boundary 602 in comparison to the distance ($D_{fv2}$, $D_{fv3}$) for the other fingerprints (R2, R3). Therefore, the vector for the first finger R1 is set as the tightest point seen online and the minimum vector distance ($D_{min}$) is set to the distance ($D_{fv1}$) of the first finger R1. Accordingly, as shown in FIG. 6B a modified decision boundary 604 may be specified based on the value of the minimum vector distance ($D_{min}$) and the number of received fingerprints N. It should be noted that the initial decision boundary 602 calculated from the off-line training is also maintained.

In one example, a specified margin function for the feature vector distance ($D_{fv}$) to the off-line trained boundary (e.g., initial decision boundary) is:

$$D_{fv} > (D_{min} - M_{min}) \times \left(1 - \frac{1}{N}\right)^k \quad (1)$$

In EQUATION 1, $M_{min}$ and k are fixed parameters where $M_{min}$ controls the minimum margin from the real example vector that is closest to the decision boundary, and k is a design parameter that controls the rate at which the minimum vector distance ($D_{min}$) is moved to the fingerprint feature vector that is closest to the initial decision boundary. According to aspects of the present disclosure EQUATION 1 should be satisfied for the feature vector to be classified as real.

In one configuration, the registration fingerprints are used to set the initial values of the number of fingerprints received N and the minimum vector distance ($D_{min}$). For example, if five fingerprints are registered, then N equals five and the minimum vector distance ($D_{min}$) is set to the fingerprint feature vector that is closest to the initial decision boundary. In one configuration, the initial minimum vector distance ($D_{min}$) could have a special value such as infinity. When the minimum vector distance ($D_{min}$) has a special value, EQUATION 1 is not used so that a divide by zero is avoided while N equals zero. Rather, the default boundary is used. Additionally, once the first valid fingerprint triggers the previously discussed updating, N is incremented to be greater than or equal to one, the minimum vector distance ($D_{min}$) is a finite value, and a fingerprint is considered real when EQUATION 1 is satisfied. Other equations could be used that would have different rates and tradeoffs of increasing the required margin toward the minimum vector distance ($D_{min}$), and saturating at the minimum vector distance ($D_{min}$) or ($D_{min} - M_{min}$).

Based on the margin equation shown in EQUATION 1, when the number of fingerprints received N is less than a threshold, the true/doctored finger classifier is based primarily on the initial decision boundary. Still, as the number of received fingerprints N increases to be greater than a threshold, a better understanding of the owner's finger feature vectors is obtained. Thus, the modified decision boundary is adjusted to customize to the owner's finger. The orientation of the decision boundary does not change, rather, the decision boundary location changes. Therefore, the absence of negative examples in the online training does not have an undue detrimental effect by over-fitting to the user's finger and changing the boundary orientation.

Thus, each time the device owner successfully uses their fingerprint to unlock their device, or for other purposes, the decision boundary of the true finger classifier is moved to the closest received finger that is real.

Figure 7:
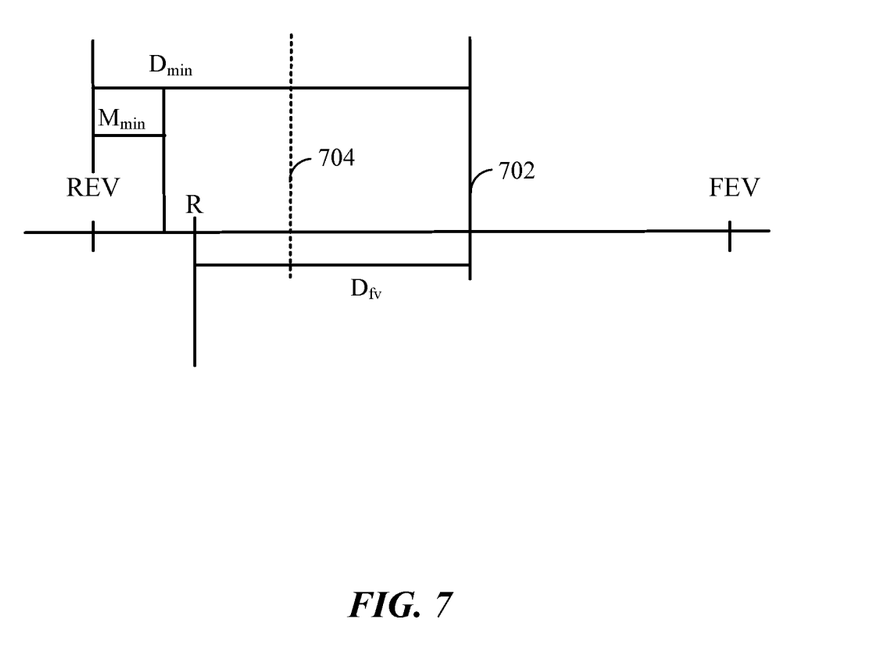

FIG. 7 illustrates an example of using a specified margin function for the feature vector distance. As shown in FIG. 7, a real example vector (REV) and a modified decision boundary 704 have been calculated based on online training. The initial decision boundary 702 and fake example vector (FEV) are also shown in FIG. 7. Furthermore, as shown in FIG. 7, after determining the real example vector, modified decision boundary 704, initial decision boundary 702, and fake example vector, the device may receive a new fingerprint testing sample R. In this example, the device determines whether the feature vector distance ($D_{fv}$) for the new fingerprint testing sample R is greater than $$(D_{min} - M_{min}) \times \left(1 - \frac{1}{N}\right)^k,$$

where $D_{min}$ is the distance of the real example vector to the initial decision boundary 702, $M_{min}$ controls the minimum margin from the real example vector that is closest to the decision boundary, and $$\left(1 - \frac{1}{N}\right)^k$$

is a function based on the number of fingerprints that are seen. In the present configuration, to be considered as valid, the fingerprint sample should exceed both boundaries 702 and 704. Still, if the minimum vector distance ($D_{min}$) equals zero and $M_{min}$ equals one, then ($D_{min} - M_{min}$) equals negative one and the boundary may be shifted to the right of 702. Thus, in one configuration, the sample should exceed both boundaries. In another configuration, the fingerprint sample is based on whether the value of max(0, EQUATION 1) is greater than or equal to zero.

That is, the initial decision boundary 702 is one test of true/false (e.g., real/fake) and the modified decision boundary 704 is a second test of true/false or real/fake. It is desirable to classify a sample as real by exceeding (e.g., being to the left of) both the initial decision boundary 702 and the modified decision boundary 704. In one configuration, the distance to the initial decision boundary 702 and/or the modified decision boundary 704 is determined and the distance is compared to the value of max(0, EQUATION 1). The max(0, EQUATION 1) combines the two tests. Such that, if EQUATION 1 is greater than zero, the modified decision boundary 704 is to the left of the initial decision boundary 702 and is the active boundary constraint. Additionally, if EQUATION 1 is less than zero, which is possible when the minimum vector distance ($D_{min}$) is less than $M_{min}$, the modified decision boundary 704 is to the right of the initial decision boundary 702, thus the initial decision boundary 702 is the active boundary constraint.

As previously discussed, when receiving a new fingerprint testing sample during online training, if it is determined that the feature vector distance ($D_{fv}$) for a new fingerprint testing sample R is greater than $$(D_{min} - M_{min}) \times \left(1 - \frac{1}{N}\right)^k,$$

then the new fingerprint testing sample R and the initial decision boundary 702 are used determine the modified decision boundary 704. The feature vector distance ($D_{fv}$) is the distance from the feature vector for the fingerprint to the off-line trained decision boundary. The feature vector distance may have a positive sign for being on the real side of the boundary and a negative sign for being on the false side of the boundary.

In another example, the new fingerprint testing sample R may be rejected if the feature vector distance ($D_{fv}$) for the new fingerprint testing sample R is less than $$(D_{min} - M_{min}) \times \left(1 - \frac{1}{N}\right)^k.$$

In some cases, based on the example shown in FIG. 7, when the number of fingerprints received N is greater than a threshold, such that $$\left(1 - \frac{1}{N}\right)^k$$

is approximately one, the modified decision boundary 704 is shifted to the left to be at the minimum vector distance ($D_{min}$). Still, it is desirable to have a distance between the modified decision boundary 704 and the minimum vector distance ($D_{min}$). Therefore, the modified decision boundary 704 is shifted to the right of the minimum vector distance ($D_{min}$) by an amount $M_{min}$. When the number of fingerprints received N is less than a threshold, the modified decision boundary 704 is shifted further to the right toward the initial decision boundary 702 by decaying the ($D_{min}-M_{min}$) value by $$\left(1 - \frac{1}{N}\right)^k.$$

In some cases, outliers may be used as a negative match or a positive match. In one configuration, to reduce the effects of outliers, when an outlier is received, instead of the computed minimum vector distance ($D_{min}$) from the closest distance ($D_{fv}$) between a received fingerprint and the initial decision boundary, the distances ($D_{fv}$) of the received fingerprints may be sorted to determine a cumulative distribution. In this configuration, the 95th percentile point of the received fingerprints is used as the minimum vector distance ($D_{min}$).

That is, in one configuration, the device maintains all of the distances ($D_{fv}$) of the received fingerprints and selects the 95th percentile closest distance ($D_{fv}$) or 98th percentile closest distance ($D_{fv}$) instead of the distance ($D_{fv}$) that is closest to the initial decision boundary. The 95th percentile and 98th percentile are two different examples. Of course, aspects of the present disclosure are not limited to the 95th percentile and 98th percentile as other values are contemplated.

In one configuration, a specific number of fingerprint feature vectors, such as one hundred, are maintained. Thus, when a new fingerprint feature vector passes the test, one of the fingerprint example vectors is randomly discarded to maintain the specific number of values. The number of values may be random.

In another configuration, a specific number of fingerprint feature vectors closest to the initial decision boundary is maintained, such as k closest fingerprint feature vectors. Additionally, in this configuration, the fingerprint feature vector of the maintained fingerprint feature vectors that is furthest from the initial decision boundary is used to determine the minimum vector distance ($D_{min}$). In this configuration, the k−1 other fingerprint feature vectors are dropped as potential outliers.

In yet another configuration, the minimum vector distance ($D_{min}$) may not be decreased by more than a given percent, such as ten percent. Thus, after the initial set of registration prints set the initial minimum vector distance ($D_{min}$), then a new minimum vector distance ($D_{min}$) is only updated if the new minimum vector distance ($D_{min}$) is greater than or equal to ninety percent of the old minimum vector distance ($D_{min}$). In some cases, distributions are often denser while outliers may be sparse. Thus, over time, the minimum vector distance ($D_{min}$) may observe a series of values reducing the minimum vector distance ($D_{min}$) in incremental steps while discarding outliers.

Additionally, or alternatively, the device may use an outer loop to target a given false rejection rate (FRR). For example, the target false rejection rate may be two percent. Thus, in one configuration, each time a fingerprint passes the baseline/off-line trained decision boundary, the fingerprint is subsequently tested against the online modified boundary. If the fingerprint passes based on the online modified boundary, the distance is increased by ninety-eight percent of a value. In one example, a fingerprint sample at the modified decision boundary location for one hundred fingerprints will pass ninety-eight times and fail two times, such that (98*pass)−(2*fail)=0 or fail value=(98/2)*pass value. In this example, on average, the modified decision boundary stays in the same location. The value is specified to be small enough so that the modified decision boundary does not move much over the one hundred trials. Furthermore, the value is specified to be large enough so that the modified decision boundary moves over a reasonable training time.

Alternatively, if the fingerprint fails based on the modified decision boundary, the distance is decreased by two percent of a value. The inner loop of the present configuration should converge toward a two percent false rejection rate, should be no worse than the initial decision boundary, and/or should be tested against both boundaries.

In some cases, the modified decision boundary may be moved closer to the fake example vector. In one configuration, a limit may be specified for the decreases of the modified decision boundary, such as not allowing more than two decreases for every twenty-five increases. In another configuration, the decrease is limited to prevent further decreases until there have been one or more increases. The decrease refers to moving the modified decision boundary closer to the fake example vector.

In another configuration, the modified decision boundary may be moved closer to the fake example vector if there is a liveness failure within a specified time, such as two seconds, of a liveness and true print successful classification. The liveness classifier determines whether the finger is a real (e.g., live) finger. In this configuration, if multiple attempts occurred in a short back-to-back predetermined time, the failure case may be used as if it was a success case for updating the minimum vector distance ($D_{min}$) value. In some cases, the liveness failure may be limited to no worse than the off-line trained model. Additionally, or alternatively, for general cases the back-to-back attempts may push the modified decision boundary closer to the fake example vector.

In some cases, it may be desirable to push the modified decision boundary closer to the fake example vector. In one configuration, for some cases, such as security applications, the modified decision boundary should not be less than the off-line trained boundary. For example, the minimum vector distance ($D_{min}$) should be greater than or equal to zero. For other cases, such as non-security applications, the modified decision boundary may be moved beyond the off-line boundary. For example, the minimum vector distance ($D_{min}$) may be less than zero.

In another configuration, statistics of the samples may be used, such as the variance of the measured distances ($D_{fv}$) to select parameters/models for how fast the modified decision boundary is improved. For example, if the distances ($D_{fv}$) have a small variance, then $M_{min}$, and k may be small. Alternatively, if the distances ($D_{fv}$) have a large variance, then the $M_{min}$, and k may be large. For example, k=a*var(R)+b, for some choice of a and b, or other functions, where R is the set of observed feature vector distance and may use the measured distances ($D_{fv}$) as a notation. The variance may also be measured and used to detect outliers, such as not decreasing the minimum vector distance ($D_{min}$) by more than one standard deviation when the value of one could be specified.

In some cases, the modified decision boundary may be adapted based on the classifier score. For some cases, multiple classifiers are used to determine whether the fingerprint identity matches. Thus, rather than adding the minimum vector distance ($D_{min}$) based on the closest print that passes the identity match, the classifier score or confidence from the identity classifier is used to adapt the liveness classifier threshold. That is, it may be desirable to also use classification information.

Specifically, in one configuration, a fingerprint may have two or more classifiers. One classifier may determine if the fingerprint is from the valid user. The second classifier may determine if the print is from a real finger. Thus, in one configuration, both classifiers are jointly determined. For example, if there is a strong confidence that the print is from a valid user, it may be more likely to be a real fingerprint. Therefore, if the fingerprint is from a valid user, the boundaries for determining whether the fingerprint is from a real or fake finger may be relaxed. In one configuration, the minimum vector distance ($D_{min}$) is multiplied by an identity confidence (C), where the identity confidence is between zero and one, and the confidence is a parameter. In this example, the higher the identity confidence, the looser the liveness boundary.

The identity confidence is a normalized score of the valid user classifier. That is, the valid user classifier may provide a score C between 0 and 1, where 1 refers to a high confidence that the fingerprint matches the valid user fingerprint and 0 refers to a high confidence the fingerprint does not match the valid user fingerprint. In this configuration, for the second liveness classifier, a fingerprint is real is if $D_{fv}$ is greater than ((1−C)*Dmin).

In one configuration, the model parameters, such as $D_{min}$ and N, k, and $M_{min}$, are crowd sourced to a central location. The model parameters may be pushed out to either existing or new devices to improve the out of the box false rejection rate/false acceptance rate performance.

In some cases, for some positive class values there may be a variance over time, such as difference over night and day, or from summer to winter. In one configuration, a time window component may be specified. In another configuration, in addition to, or alternate from, using the number of fingerprints N to determine the minimum vector distance ($D_{min}$), a time frame may be also be specified. That is, if a user swipes their finger one thousand times in a time frame, such as two minutes, the system may not be receiving the aforementioned variations that may be protected by using the $$\left(1 - \frac{1}{N}\right)^k$$

term. Thus, $$\left(1 - \frac{1}{N}\right)^k$$

of EQUATION 1 may be multiplied by min(1,t/T), where t and T define different times. For example, T is 365 days and t is the time in days since the first online fingerprint was received. Thus, in this example, after 91 days t=91 and t/T=91/365~0.25. Therefore, $$\left(1 - \frac{1}{N}\right)^k * \min(1, t/T) = \left(1 - \frac{1}{N}\right)^k * 0.25.$$

Thus, $$D_{fv} > (D_{min} - M_{min}) \times .25 \times \left(1 - \frac{1}{N}\right)^k$$

determines the modified decision boundary. In another example, if t=4000 days, then min(1, 4000/365)=1. Accordingly, after a year the margin is specified based on the margin previously discussed in the disclosure. Still, before the end of a year (T), an additional margin may be specified to collect data.

Therefore, based on the example of FIG. 7, when t is small, the product of $$\left(1 - \frac{1}{N}\right)^k$$

and min(1,t/T) is near zero and the initial decision boundary 702 threshold is used. Still, as t approaches T, the product of $$\left(1 - \frac{1}{N}\right)^k$$

and min(1, t/T) becomes 1 and the modified decision boundary 704 is used.

It should be noted that for both the aforementioned configuration and for the baseline configuration, EQUATION 1 may use the initial decision boundary 702 until the number of received fingerprints N is greater than a received fingerprint threshold and/or the time is greater than a time threshold, at which point EQUATION 1 uses ($D_{min}$–$M_{min}$).

In another configuration, instead of moving the decision boundary as described above, the running online sample standard deviation and mean are computed based on values exceeding the initial off-line trained decision boundary. After receiving a specific number of fingerprints, a second test may be applied to determine if the value passes the off-line trained boundary and is within a number of online computer standard-deviations of the online computed mean distance value.

In yet another configuration, the online training is stopped if the modified decision boundary approaches a specified threshold. For example, the online training may be stopped when $(1-1/N)^k$ is greater than 0.95. That is, training may be stopped when a condition is met. For example, training may be stopped based on a number of fingerprints received N, the passage of a certain amount of time, a threshold on the minimum vector distance ($D_{min}$), and/or other appropriate conditions.

Furthermore, an outer loop may be used to track the false rejection rate. Specifically, if the false rejection rate is greater than a threshold, the false rejection rate is reset or the number of received fingerprints N, K, and/or the minimum vector distance ($D_{min}$) are decreased. That is, in some cases, if training is stopped, it may be desirable to start training again. For example, a configuration may have been specified that was more robust to outliers (as mentioned above). Still, the training may be stopped in a state with outliers. Thus, it would be desirable to detect when to re-start training and what to do when the training is re-started. In one example, the training may be re-started by tracking the false rejection rate and determining if the false rejection rate exceeds a threshold.

In some cases, the training may be re-started from the beginning (e.g., discarding previous information). In another configuration, the training may be re-started from a previous training position, such as rewinding the training to a specific point. The rewinding may reset or decrease values. In another configuration, the training may continue by pushing out the criteria to stop by increasing the N threshold or the T threshold to stop. In this example, the threshold may increase from 0.95 to 0.96. The T threshold refers to the value of $(1-1/N)^k$. The N threshold refers to the number of received fingerprints.

Aspects of this disclosure are not limited to a binary classification use case and are contemplated for other uses. For example, in a multi-class classifier there are typically a set of classifier boundaries. As an example, a multi-class classifier is a three-class classifier that classifies pedestrians, cars, and trucks. Aspects of the present disclosure may be used to vary and adapt the target margin from the off-line trained classifier boundaries. Furthermore, aspects of the present disclosure are not limited to fingers, fingerprints, and/or fingerprint readers. Of course, the aspects of the present disclosure are also contemplated for other uses for verifying an object (e.g., face, an iris or any other object) and/or training based on an object.

Figure 8:
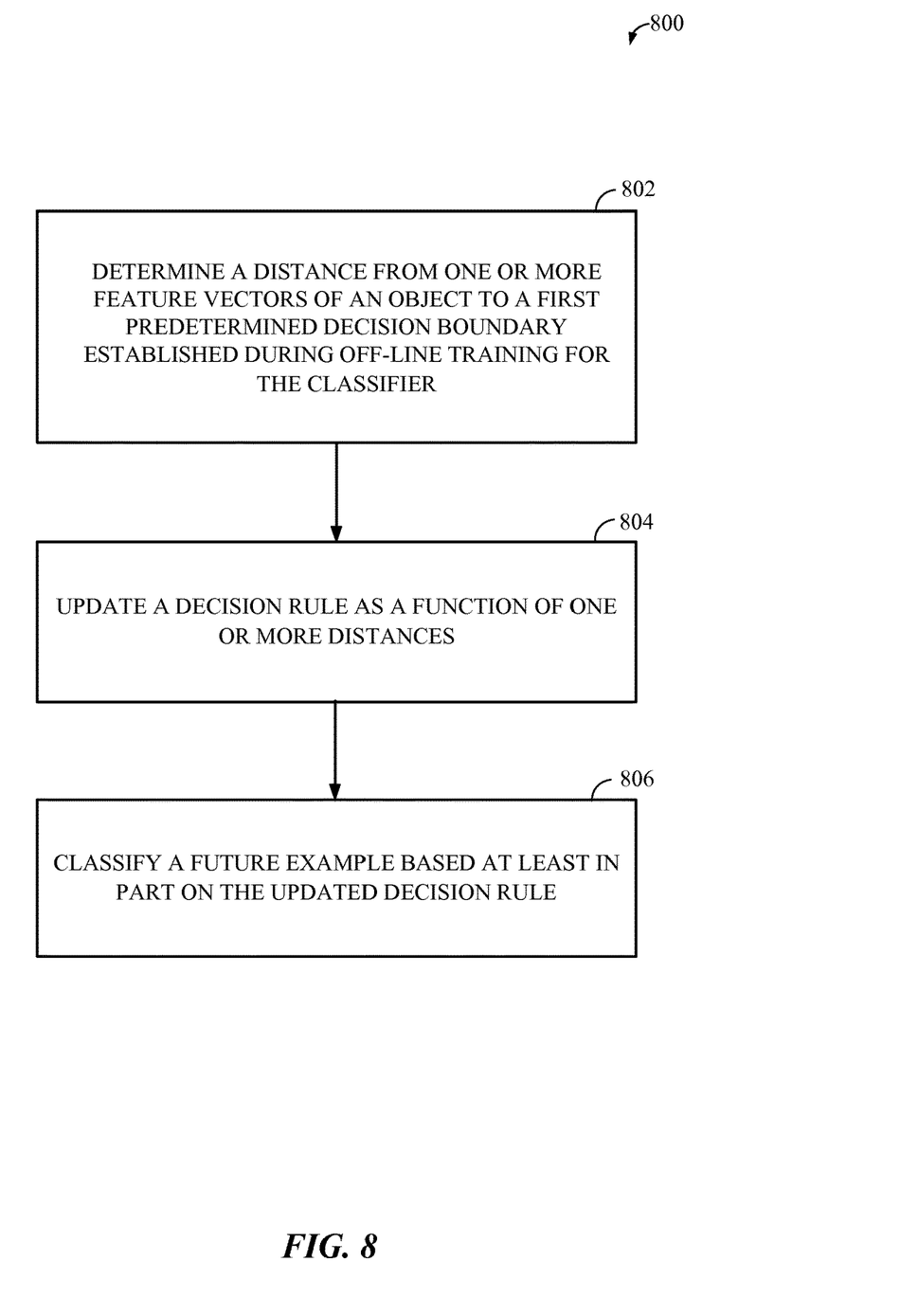
FIGS. 8 and 9 are flow diagrams illustrating methods for online training according to aspects of the present disclosure.

FIG. 8 shows a method 800 for online training of a linear classifier according to one aspect of the disclosure. A classifier determines a distance from one or more feature vectors of an object to a first predetermined decision boundary established during off-line training for the classifier, as shown in block 802. The one or more examples are observed during the online training. The classifier updates a decision rule as a function of one or more distances, as shown in block 804. Additionally, the classifier classifies a future example based on the updated decision rule, as shown in block 806.

Figure 9:
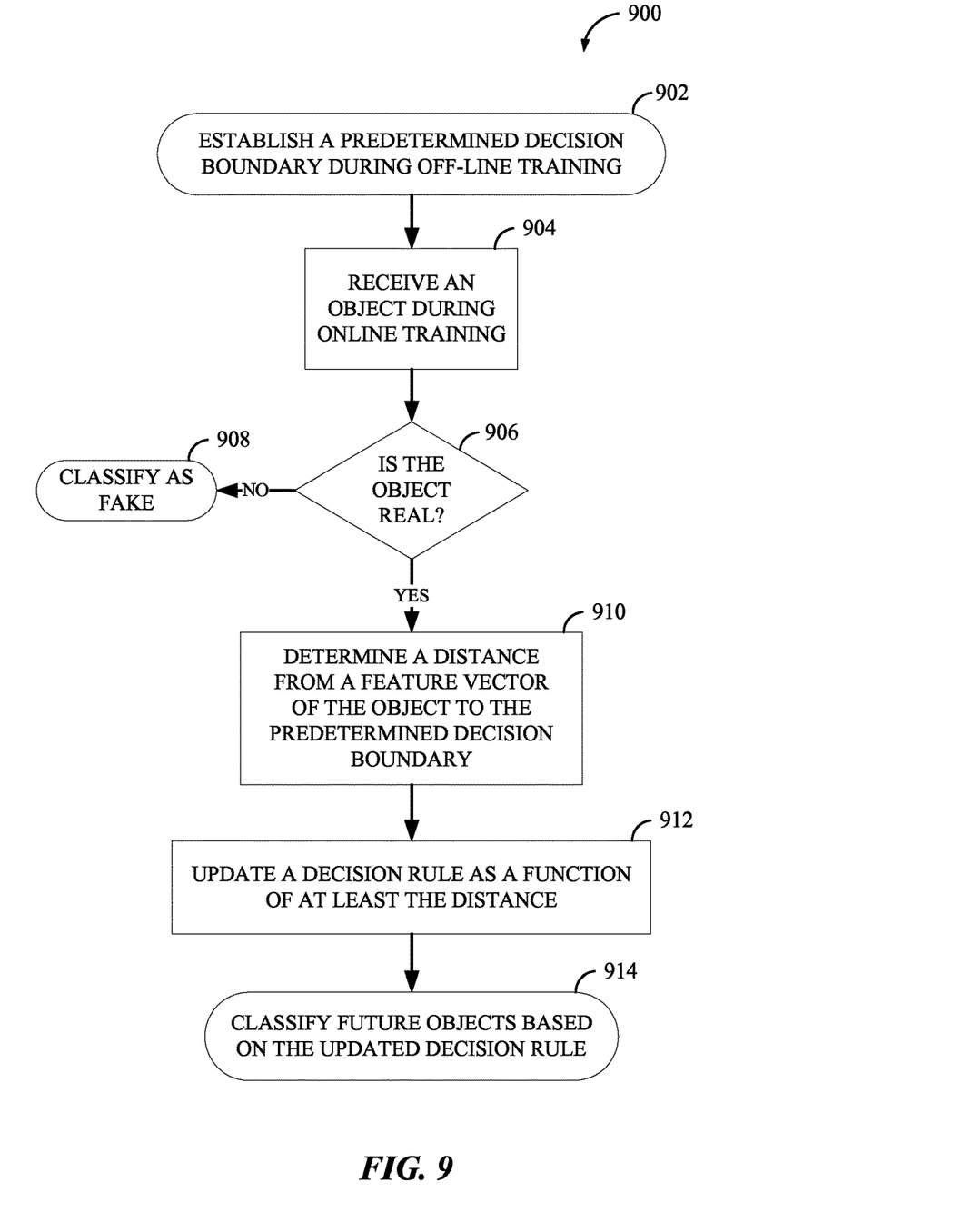

FIG. 9 shows a flow diagram 900 for online training of a linear classifier according to one aspect of the disclosure. As shown in FIG. 9, at block 902 a predetermined decision boundary is established during off-line training. As previously discussed, the predetermined decision boundary may be established by using real and fake examples of an object that is to be classified. Furthermore, at block 904, an object is received during online training. Additionally, at block 906, the device determines whether the received object is a real object or a fake object based on the predetermined decision boundary.

In one configuration, if the object is fake, the received object is classified as fake (block 908). Additionally, if the received object is real, the device determines a distance from a feature vector of the object to the predetermined decision boundary (block 910). Furthermore, after determining the distance, the device may update a decision rule as a function of at least the distance (block 912). Finally, future objects are classified based on the updated decision rule (block 914).

In one configuration, a machine learning model is configured for determining a distance from one or more examples of an object, which is observed during the online training, to a first predetermined decision boundary established during off-line training for the classifier; updating a decision rule as a function of the distance; and classifying a future example based on the updated decision rule. The model includes a determining means, updating means, and/or classifying means. In one aspect, the determining means, updating means, and/or classifying means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of online training of a classifier, the method comprising:
    determining a distance from at least one feature vector of an object, which is observed during the online training, to a first decision boundary established during off-line training for the classifier, the first decision boundary defined between a true object vector and a false object vector;
    updating a decision rule as a function of at least the distance; and
    classifying a future example based at least in part on a second decision boundary established from the updated decision rule.

2. The method of claim 1, in which the function is further based at least in part on a number of observed positive examples, and/or an amount of observed time since a start of the online training.

3. The method of claim 1, in which the object is a fingerprint, an iris, and/or a face.

4. The method of claim 1, further comprising reducing a margin between the at least one feature vector of the object and the second decision boundary based at least in part on a number of positive examples that are observed.

5. The method of claim 1, in which the decision rule is based at least in part on a measured mean and/or a variance of the distance.

6. The method of claim 1, further comprising iteratively updating the decision rule based at least in part on new data.

7. The method of claim 6, further comprising stopping updates to the decision rule based at least in part on a first set of conditions.

8. The method of claim 7, in which the first set of conditions comprise at least a number of samples, and/or an amount of time.

9. The method of claim 7, further comprising starting updates to the decision rule based at least in part on a second set of conditions.

10. The method of claim 9, in which the second set of conditions comprise a false rejection rate.

11. The method of claim 9, in which starting updates to the decision rule comprises resetting, re-using, or backing up at least one learned value.

12. The method of claim 9, in which starting updates to the decision rule comprises modifying the first set of conditions.

13. The method of claim 1, further comprising computing and tracking a false rejection rate (FRR) and further updating the decision rule based at least in part on the FRR.

14. The method of claim 1, in which the function further comprises tracking a plurality of distances and the decision rule is based at least in part on statistics of the plurality of distances.

15. The method of claim 1, in which the second decision boundary is defined between the first decision boundary and the true object vector.

16. An apparatus for online training of a classifier, the apparatus comprising:
    a memory unit; and
    at least one processor coupled to the memory unit; the at least one processor configured:
        to determine a distance from at least one feature vector of an object, which is observed during the online training, to a first decision boundary established during off-line training for the classifier, the first decision boundary defined between a true object vector and a false object vector;
to update a decision rule as a function of at least the distance; and
to classify a future example based at least in part on a second decision boundary established from the updated decision rule.

17. The apparatus of claim 16, in which the function is further based at least in part on a number of observed positive examples, and/or an amount of observed time since a start of the online training.

18. The apparatus of claim 16, in which the object is a fingerprint, an iris, and/or a face.

19. The apparatus of claim 16, in which the at least one processor is further configured to reduce a margin between the at least one feature vector of the object and the second decision boundary based at least in part on a number of positive examples that are observed.

20. The apparatus of claim 16, in which the decision rule is based at least in part on a measured mean and/or a variance of the distance.

21. The apparatus of claim 16, in which the at least one processor is further configured to iteratively update the decision rule based at least in part on new data.

22. The apparatus of claim 21, in which the at least one processor is further configured to stop updates to the decision rule based at least in part on a first set of conditions.

23. The apparatus of claim 22, in which the first set of conditions comprise a number of samples, and/or an amount of time.

24. The apparatus of claim 22, in which the at least one processor is further configured to start updates to the decision rule based at least in part on a second set of conditions.

25. The apparatus of claim 24, in which the second set of conditions comprise a false rejection rate.

26. The apparatus of claim 24, in which the at least one processor is further configured to start updates to the decision rule by resetting, re-using, or backing up at least one learned value.

27. The apparatus of claim 24, in which the at least one processor is further configured to start updates to the decision rule by modifying the first set of conditions.

28. The apparatus of claim 16, in which the at least one processor is further configured to compute and track a false rejection rate (FRR) and further update the decision rule based at least in part on the FRR.

29. The apparatus of claim 16, in which the at least one processor is further configured to track a plurality of distances, and the decision rule is based at least in part on statistics of the plurality of distances.

30. The apparatus of claim 16, in which the second decision boundary is defined between the first decision boundary and the true object vector.

31. A non-transitory computer-readable medium having program code recorded thereon, the program code being executed by a processor and comprising:
program code to determine a distance from at least one feature vector of an object, which is observed during the online training, to a first decision boundary established during off-line training for a classifier, the first decision boundary defined between a true object vector and a false object vector;
program code update a decision rule as a function of at least the distance; and
program code classify a future example based at least in part on a second decision boundary established from the updated decision rule.

32. An apparatus for online training of a classifier, the method comprising:
means for determining a distance from at least one feature vector of an object, which is observed during the online training, to a first decision boundary established during off-line training for the classifier, the first decision boundary defined between a true object vector and a false object vector;
means for updating a decision rule as a function of at least the distance; and
means for classifying a future example based at least in part on a second decision boundary established from the updated decision rule.

* * * * *